(12) United States Patent
Davie et al.

(10) Patent No.: US 11,380,167 B2
(45) Date of Patent: *Jul. 5, 2022

(54) SYSTEM AND METHOD FOR OFFERING INTRADAY WAGERING IN A FINANCIAL MARKET ENVIRONMENT

(71) Applicant: CANTOR INDEX, LLC, New York, NY (US)

(72) Inventors: Christopher John Davie, London (GB); Guy Iain Oliver Riches, Leicestershire (GB)

(73) Assignee: CANTOR INDEX, LLC, New York, NY (US)

(*) Notice: Subject to any disclaimer, the term of this patent is extended or adjusted under 35 U.S.C. 154(b) by 1319 days.

This patent is subject to a terminal disclaimer.

(21) Appl. No.: 14/456,113

(22) Filed: Aug. 11, 2014

(65) Prior Publication Data

US 2015/0099574 A1 Apr. 9, 2015

Related U.S. Application Data

(63) Continuation of application No. 13/099,954, filed on May 3, 2011, now Pat. No. 8,805,732, which is a (Continued)

(51) Int. Cl.
*G07F 17/32* (2006.01)
*G06Q 40/00* (2012.01)
(Continued)

(52) U.S. Cl.
CPC ......... *G07F 17/3288* (2013.01); *G06Q 40/00* (2013.01); *G06Q 40/04* (2013.01);
(Continued)

(58) Field of Classification Search
USPC .......................................... 705/36
See application file for complete search history.

(56) References Cited

U.S. PATENT DOCUMENTS 3,810,627 A  5/1974 Levy
4,457,424 A  8/1984 Hedges
(Continued)

FOREIGN PATENT DOCUMENTS

AU  2004227808  1/2004
AU  2007329176  12/2007
(Continued)

OTHER PUBLICATIONS

Peter Temple, Online Spread Betting, May 2002 (Post 911 Trading) (Year: 2002).*
(Continued)

*Primary Examiner* — Chikaodinaka Ojiaku

(57) ABSTRACT

A method for providing a wager in a financial market environment is provided that includes presenting an opportunity to make a wager that is based on a moving market line associated with a financial market. An end user is given an opportunity to bet on whether a financial market value will be above or below the moving market line at a designated time. The wager may be accepted from the end user. The wager may be monitored in order to determine whether the financial market value was above or below the moving market line at the designated time.

20 Claims, 3 Drawing Sheets

Related U.S. Application Data continuation of application No. 12/726,954, filed on Mar. 18, 2010, now Pat. No. 7,937,318, which is a continuation of application No. 10/795,163, filed on Mar. 5, 2004, now Pat. No. 7,711,628.

(51) Int. Cl.
  *G06Q 40/06* (2012.01)
  *G06Q 40/04* (2012.01)
  *G06Q 50/34* (2012.01)

(52) U.S. Cl.
  CPC ............ *G06Q 40/06* (2013.01); *G06Q 50/34* (2013.01); *G07F 17/3244* (2013.01)

(56) References Cited

U.S. PATENT DOCUMENTS

| | | | |
|---|---|---|---|
| 4,569,526 A | 2/1986 | Hamilton | |
| 4,666,160 A | 5/1987 | Hamilton | |
| 4,695,053 A | 9/1987 | Vazquez, Jr. et al. | |
| 4,856,788 A | 8/1989 | Fischel | |
| 4,874,177 A | 10/1989 | Girardin | |
| 4,875,164 A | 10/1989 | Monfort | |
| 4,962,950 A | 10/1990 | Champion | |
| 5,108,109 A | 4/1992 | Leban | |
| 5,249,800 A | 10/1993 | Hilgendorf et al. | |
| 5,490,670 A * | 2/1996 | Hobert | A63F 3/00157 273/274 |
| 5,524,888 A | 6/1996 | Heidel | |
| 5,573,244 A * | 11/1996 | Mindes | G06Q 50/34 463/26 |
| 5,575,474 A | 11/1996 | Rossides | |
| 5,586,937 A | 12/1996 | Menashe | |
| 5,588,650 A | 12/1996 | Eman et al. | |
| 5,695,402 A | 12/1997 | Stupak | |
| 5,713,793 A | 2/1998 | Holte | |
| 5,718,431 A | 2/1998 | Ornstein | |
| 5,743,525 A | 4/1998 | Haddad | |
| 5,749,785 A * | 5/1998 | Rossides | G06Q 50/34 463/25 |
| 5,762,552 A * | 6/1998 | Vuong | G07F 17/32 463/17 |
| RE35,864 E * | 7/1998 | Weingardt | A63F 3/081 463/28 |
| 5,801,766 A | 9/1998 | Alden | |
| 5,830,068 A | 11/1998 | Brenner et al. | |
| 5,842,921 A | 12/1998 | Mindes et al. | |
| 5,851,010 A | 12/1998 | Feinberg | |
| 5,857,909 A | 1/1999 | Rubin | |
| 5,868,392 A * | 2/1999 | Kraft | A63F 3/00157 273/292 |
| 5,873,782 A | 2/1999 | Hall | |
| 5,888,136 A | 3/1999 | Herbert | |
| 6,024,641 A | 2/2000 | Sarno | |
| 6,026,383 A | 2/2000 | Ausubel | |
| 6,038,554 A * | 3/2000 | Vig | G06Q 10/0875 705/306 |
| 6,053,813 A | 4/2000 | Mathis | |
| 6,059,659 A | 5/2000 | Busch | |
| 6,078,904 A * | 6/2000 | Rebane | G06Q 40/00 705/35 |
| 6,102,400 A * | 8/2000 | Scott | A63F 3/00157 273/138.1 |
| 6,102,402 A * | 8/2000 | Scott | A63F 3/00157 273/274 |
| 6,110,042 A | 8/2000 | Walker et al. | |
| 6,113,492 A | 9/2000 | Walker et al. | |
| 6,126,543 A | 10/2000 | Friedman | |
| 6,131,906 A | 10/2000 | Green | |
| 6,152,822 A | 11/2000 | Herbert | |
| 6,157,918 A * | 12/2000 | Shepherd | G06Q 30/08 705/35 |
| 6,190,255 B1 | 2/2001 | Thomas et al. | |
| 6,195,647 B1 * | 2/2001 | Martyn | G06Q 40/00 705/35 |
| 6,296,569 B1 | 10/2001 | Congello, Jr. | |
| 6,309,307 B1 | 10/2001 | Krause et al. | |
| 6,321,212 B1 | 11/2001 | Lange | |
| 6,325,721 B1 | 12/2001 | Miyamoto et al. | |
| 6,331,148 B1 | 12/2001 | Krause et al. | |
| 6,343,988 B1 | 2/2002 | Walker et al. | |
| 6,358,150 B1 | 3/2002 | Mir et al. | |
| 6,394,899 B1 | 5/2002 | Walker | |
| 6,413,162 B1 | 7/2002 | Baerlocher et al. | |
| 6,421,653 B1 * | 7/2002 | May | G06Q 30/08 705/36 R |
| 6,443,841 B1 | 9/2002 | Rossides | |
| 6,450,887 B1 | 9/2002 | Mir et al. | |
| 6,527,270 B2 * | 3/2003 | Maksymec | G06Q 50/34 273/138.1 |
| 6,558,255 B2 | 5/2003 | Walker et al. | |
| 6,575,834 B1 | 6/2003 | Lindo | |
| 6,612,579 B1 * | 9/2003 | Cembruch | A63F 3/00157 273/146 |
| 6,612,927 B1 | 9/2003 | Slomiany et al. | |
| 6,616,529 B1 | 9/2003 | Qian et al. | |
| 6,632,140 B2 | 10/2003 | Berman et al. | |
| 6,659,464 B1 | 12/2003 | Champion et al. | |
| 6,709,330 B1 | 3/2004 | Klein et al. | |
| 6,855,054 B2 | 2/2005 | White et al. | |
| 6,869,360 B2 | 3/2005 | Marks et al. | |
| 6,890,255 B2 | 5/2005 | Jarvis et al. | |
| 6,896,615 B2 | 5/2005 | Berman | |
| 6,929,264 B2 | 8/2005 | Huard et al. | |
| 6,938,900 B2 | 9/2005 | Snow | |
| 7,018,293 B2 | 3/2006 | Brown et al. | |
| 7,029,395 B1 | 4/2006 | Baerlocher | |
| 7,040,982 B1 | 5/2006 | Jarvis et al. | |
| 7,066,813 B1 | 6/2006 | Sakamoto et al. | |
| 7,149,720 B2 * | 12/2006 | Shepherd | G06Q 40/04 705/37 |
| 7,160,189 B2 | 1/2007 | Walker et al. | |
| 7,166,028 B2 | 1/2007 | Fasbender et al. | |
| 7,206,762 B2 | 4/2007 | Sireau | |
| 7,233,922 B2 * | 6/2007 | Asher | G06Q 40/00 705/36 R |
| 7,236,953 B1 | 6/2007 | Cooper et al. | |
| 7,243,083 B2 * | 7/2007 | Burns | G06Q 40/00 705/37 |
| 7,246,093 B1 * | 7/2007 | Katz | G06Q 40/00 705/37 |
| 7,299,208 B1 * | 11/2007 | Bailon | G06Q 40/00 705/35 |
| 7,302,412 B1 * | 11/2007 | Speck | G06Q 40/025 463/16 |
| 7,315,838 B2 * | 1/2008 | Gershon | G06Q 30/08 705/35 |
| 7,349,877 B2 | 3/2008 | Ballow et al. | |
| 7,395,232 B1 | 7/2008 | Pilato | |
| 7,401,046 B2 * | 7/2008 | Hollerman | G06Q 30/02 705/36 R |
| 7,409,367 B2 * | 8/2008 | McGill | G06Q 40/06 705/37 |
| 7,494,413 B2 | 2/2009 | Singer et al. | |
| 7,496,534 B2 * | 2/2009 | Olsen | G06Q 40/00 705/35 |
| 7,553,231 B2 | 6/2009 | Rodgers et al. | |
| 7,559,838 B2 | 7/2009 | Walker et al. | |
| 7,566,270 B2 | 7/2009 | Amaitis et al. | |
| 7,587,347 B2 * | 9/2009 | Griffin | G06Q 40/00 705/35 |
| 7,601,061 B2 | 10/2009 | Jackson | |
| 7,601,062 B2 | 10/2009 | Cole et al. | |
| 7,604,537 B2 | 10/2009 | Amaitis et al. | |
| 7,604,538 B2 | 10/2009 | Pacey | |
| 7,641,549 B2 | 1/2010 | Asher et al. | |
| 7,690,991 B2 * | 4/2010 | Black | G07F 17/3288 463/26 |
| 7,693,781 B2 | 4/2010 | Asher et al. | |
| 7,711,628 B2 | 5/2010 | Davie et al. | |
| 7,801,782 B2 | 9/2010 | DeAddio | |

(56) References Cited

U.S. PATENT DOCUMENTS

| | | |
|---|---|---|
| 7,835,961 B2 | 11/2010 | Davie et al. |
| 7,867,077 B2 | 1/2011 | Baerlocher et al. |
| 7,931,528 B2 | 4/2011 | Singer et al. |
| 7,937,318 B2 | 5/2011 | Davie et al. |
| 7,962,400 B2 * | 6/2011 | Amaitis ................. G06Q 40/02 705/37 |
| 8,046,292 B2 | 10/2011 | Sireau |
| 8,086,510 B2 | 12/2011 | Amaitis et al. |
| 8,128,474 B2 | 3/2012 | Amaitis et al. |
| 8,142,283 B2 | 3/2012 | Lutnick et al. |
| 8,147,313 B2 | 4/2012 | Amaitis et al. |
| 8,177,628 B2 | 5/2012 | Manning et al. |
| 8,208,808 B2 | 6/2012 | Bernstein et al. |
| 8,535,138 B2 | 9/2013 | Amaitis et al. |
| 8,543,487 B2 | 9/2013 | Asher et al. |
| 8,585,490 B2 | 11/2013 | Amaitis et al. |
| 8,805,732 B2 * | 8/2014 | Davie ................... G06Q 40/06 705/37 |
| 10,467,845 B2 | 11/2019 | Amaitis et al. |
| 2001/0032169 A1 * | 10/2001 | Sireau .................... G06Q 50/34 705/37 |
| 2001/0047291 A1 | 11/2001 | Garahi et al. |
| 2002/0032644 A1 * | 3/2002 | Corby ................... G06Q 40/00 705/37 |
| 2002/0055381 A1 | 5/2002 | Tarantino |
| 2002/0068633 A1 | 6/2002 | Schlaifer |
| 2002/0069161 A1 | 6/2002 | Eckert et al. |
| 2002/0072978 A1 * | 6/2002 | Odom ................... G06Q 40/00 705/37 |
| 2002/0073021 A1 * | 6/2002 | Ginsberg ............. G06Q 40/025 705/38 |
| 2002/0077952 A1 | 6/2002 | Eckert et al. |
| 2002/0077961 A1 | 6/2002 | Eckert et al. |
| 2002/0087447 A1 | 7/2002 | McDonald et al. |
| 2002/0090988 A1 | 7/2002 | Frost et al. |
| 2002/0098883 A1 | 7/2002 | Packes, Jr. et al. |
| 2002/0103733 A1 * | 8/2002 | Barrington ............ G06Q 40/02 705/35 |
| 2002/0107769 A1 * | 8/2002 | Dashefsky ............ G06Q 40/04 705/35 |
| 2002/0115488 A1 | 8/2002 | Berry et al. |
| 2002/0123954 A1 * | 9/2002 | Hito ....................... G06Q 40/06 705/36 R |
| 2002/0147047 A1 | 10/2002 | Letovsky et al. |
| 2002/0151358 A1 | 10/2002 | Walker et al. |
| 2002/0151363 A1 | 10/2002 | Letovsky et al. |
| 2002/0151366 A1 | 10/2002 | Walker |
| 2002/0155884 A1 | 10/2002 | Updike |
| 2002/0161690 A1 * | 10/2002 | McCarthy ............. G06Q 40/04 705/37 |
| 2002/0198044 A1 | 12/2002 | Walker et al. |
| 2003/0003988 A1 * | 1/2003 | Walker ................ G07F 17/3225 463/21 |
| 2003/0008701 A1 | 1/2003 | Suzuki |
| 2003/0009411 A1 * | 1/2003 | Ram ..................... G06Q 40/025 705/37 |
| 2003/0018571 A1 | 1/2003 | Eckert et al. |
| 2003/0021411 A1 | 1/2003 | Seroussi et al. |
| 2003/0045336 A1 * | 3/2003 | Cherry ................ G07F 17/3288 463/16 |
| 2003/0046218 A1 * | 3/2003 | Albanese ............... G06Q 40/06 705/37 |
| 2003/0054875 A1 | 3/2003 | Marks et al. |
| 2003/0060283 A1 | 3/2003 | Rowe |
| 2003/0064807 A1 * | 4/2003 | Walker ................ G07F 17/3237 463/42 |
| 2003/0075869 A1 | 4/2003 | Breeding et al. |
| 2003/0092489 A1 | 5/2003 | Veradej |
| 2003/0096646 A1 * | 5/2003 | Zhu ..................... A63F 3/00157 463/28 |
| 2003/0096651 A1 | 5/2003 | Black |
| 2003/0104832 A1 * | 6/2003 | Ferris ................. H04M 1/72403 455/550.1 |
| 2003/0104857 A1 | 6/2003 | Jenkins |
| 2003/0109300 A1 | 6/2003 | Walker et al. |
| 2003/0125108 A1 | 7/2003 | Groz |
| 2003/0137110 A1 | 7/2003 | Huard et al. |
| 2003/0157976 A1 * | 8/2003 | Simon ................. G07F 17/3244 463/1 |
| 2003/0162594 A1 | 8/2003 | Rowe |
| 2003/0181234 A1 | 9/2003 | Falciglia |
| 2003/0195841 A1 | 10/2003 | Ginsberg et al. |
| 2003/0216170 A1 | 11/2003 | Walker et al. |
| 2003/0218303 A1 | 11/2003 | Walker et al. |
| 2003/0220134 A1 | 11/2003 | Walker et al. |
| 2003/0224852 A1 * | 12/2003 | Walker ................... G07F 17/32 463/20 |
| 2004/0032083 A1 * | 2/2004 | Walker ................... G06Q 20/00 273/269 |
| 2004/0034591 A1 * | 2/2004 | Waelbroeck ......... G06Q 50/188 705/37 |
| 2004/0058731 A1 | 3/2004 | Rossides |
| 2004/0059655 A1 | 3/2004 | Seifert et al. |
| 2004/0061285 A1 | 4/2004 | Hughes-Watts |
| 2004/0077398 A1 | 4/2004 | Jarvis et al. |
| 2004/0087357 A1 | 5/2004 | Johnson |
| 2004/0090005 A1 | 5/2004 | Snow |
| 2004/0111358 A1 * | 6/2004 | Lange ................... G07F 17/32 705/37 |
| 2004/0117292 A1 | 6/2004 | Brumfield et al. |
| 2004/0158519 A1 * | 8/2004 | Lutnick ................. G06Q 40/04 705/37 |
| 2004/0166918 A1 | 8/2004 | Walker et al. |
| 2004/0176159 A1 | 9/2004 | Walker et al. |
| 2004/0176994 A1 | 9/2004 | Fine et al. |
| 2004/0193469 A1 | 9/2004 | Amaitis et al. |
| 2004/0193531 A1 * | 9/2004 | Amaitis ............... G07F 17/3288 705/37 |
| 2004/0198487 A1 | 10/2004 | Schneider |
| 2004/0204229 A1 | 10/2004 | Walker et al. |
| 2004/0204232 A1 | 10/2004 | Asher et al. |
| 2004/0210507 A1 | 10/2004 | Asher et al. |
| 2004/0214629 A1 | 10/2004 | Walker et al. |
| 2004/0224770 A1 | 11/2004 | Wolf et al. |
| 2004/0229675 A1 * | 11/2004 | Cannella ............. G07F 17/3288 463/16 |
| 2004/0248637 A1 | 12/2004 | Liebenberg et al. |
| 2005/0021461 A1 | 1/2005 | Flake et al. |
| 2005/0027643 A1 | 2/2005 | Amaitis et al. |
| 2005/0043078 A1 | 2/2005 | Sundstrom |
| 2005/0059467 A1 | 3/2005 | Saffari et al. |
| 2005/0086143 A1 * | 4/2005 | Vlazny ................... G07F 17/32 705/35 |
| 2005/0091134 A1 | 4/2005 | Rossides |
| 2005/0102223 A1 | 5/2005 | Vlazny et al. |
| 2005/0119962 A1 | 6/2005 | Bowen et al. |
| 2005/0124408 A1 * | 6/2005 | Vlazny ............... G07F 17/3288 463/28 |
| 2005/0171878 A1 * | 8/2005 | Pennock ................ G06Q 40/00 705/35 |
| 2005/0197938 A1 * | 9/2005 | Davie ................... G06Q 40/00 705/35 |
| 2005/0197939 A1 | 9/2005 | Davie et al. |
| 2005/0197948 A1 * | 9/2005 | Davie ................... G06Q 40/00 705/37 |
| 2005/0208996 A1 | 9/2005 | Friedman |
| 2005/0245308 A1 | 11/2005 | Amaitis et al. |
| 2005/0245310 A1 | 11/2005 | Amaitis et al. |
| 2006/0066044 A1 | 3/2006 | Dabosh |
| 2006/0066051 A1 | 3/2006 | Nicely |
| 2006/0069635 A1 * | 3/2006 | Ram ..................... G06Q 30/08 705/37 |
| 2006/0084495 A1 | 4/2006 | Jaffe et al. |
| 2006/0105839 A1 | 5/2006 | Graeve et al. |
| 2006/0105840 A1 | 5/2006 | Graeve |
| 2006/0160605 A1 | 7/2006 | Hornik et al. |
| 2006/0199631 A1 | 9/2006 | McGill et al. |
| 2006/0205485 A1 | 9/2006 | Walker et al. |
| 2006/0205486 A1 | 9/2006 | Walker et al. |
| 2006/0217199 A1 | 9/2006 | Adcox |
| 2006/0249907 A1 | 11/2006 | Wong et al. |

(56) References Cited

U.S. PATENT DOCUMENTS

| | | |
|---|---|---|
| 2006/0258429 A1 | 11/2006 | Manning et al. |
| 2006/0265304 A1* | 11/2006 | Brumfield .............. G06Q 40/00 705/35 |
| 2006/0267274 A1 | 11/2006 | Cammegh |
| 2006/0287072 A1 | 12/2006 | Walker et al. |
| 2007/0026923 A1 | 2/2007 | Muir |
| 2007/0054726 A1 | 3/2007 | Muir et al. |
| 2007/0075490 A1 | 4/2007 | Gak |
| 2007/0083457 A1* | 4/2007 | Evelyn .................. G06Q 40/04 705/37 |
| 2007/0088661 A1 | 4/2007 | De Verdier et al. |
| 2007/0111777 A1* | 5/2007 | Amaitis .................. G07F 17/32 463/16 |
| 2007/0117624 A1 | 5/2007 | Amaitis et al. |
| 2007/0120320 A1 | 5/2007 | Miltenberger et al. |
| 2007/0123336 A1 | 5/2007 | Amaitis et al. |
| 2007/0129138 A1 | 6/2007 | Amaitis et al. |
| 2007/0192234 A1 | 8/2007 | Sireau |
| 2007/0207849 A1 | 9/2007 | Asher et al. |
| 2007/0208642 A1 | 9/2007 | Asher et al. |
| 2007/0288348 A1 | 12/2007 | Sireau |
| 2008/0004116 A1 | 1/2008 | Van Luchene et al. |
| 2008/0032778 A1* | 2/2008 | Amaitis .................. G07F 17/34 463/20 |
| 2008/0039189 A1 | 2/2008 | Walker et al. |
| 2008/0051171 A1 | 2/2008 | Lutnick et al. |
| 2008/0081685 A1* | 4/2008 | Naftaly ............... G07F 17/3288 463/16 |
| 2008/0085757 A1 | 4/2008 | Sato |
| 2008/0128986 A1 | 6/2008 | Morris et al. |
| 2008/0128991 A1 | 6/2008 | Fisher et al. |
| 2008/0132315 A1 | 6/2008 | Fisher et al. |
| 2008/0132316 A1 | 6/2008 | Fisher et al. |
| 2008/0200242 A1* | 8/2008 | Ginsberg .............. G07F 17/323 463/25 |
| 2008/0214274 A1 | 9/2008 | Thomas et al. |
| 2008/0275824 A1* | 11/2008 | Assia ...................... G06Q 40/04 705/36 R |
| 2009/0061995 A1* | 3/2009 | Assia ...................... G07F 17/32 463/25 |
| 2009/0062016 A1* | 3/2009 | Assia ...................... G07F 17/32 463/42 |
| 2009/0093300 A1 | 4/2009 | Lutnick et al. |
| 2009/0163265 A1 | 6/2009 | Amaitis et al. |
| 2009/0163266 A1 | 6/2009 | Amaitis et al. |
| 2009/0209312 A1 | 8/2009 | Alderucci et al. |
| 2009/0209321 A1 | 8/2009 | Alderucci et al. |
| 2010/0009743 A1 | 1/2010 | Amaitis et al. |
| 2010/0039209 A1 | 2/2010 | DeWeese et al. |
| 2010/0048302 A1 | 2/2010 | Lutnick et al. |
| 2010/0124967 A1 | 5/2010 | Lutnick et al. |
| 2010/0173698 A1 | 7/2010 | Davie et al. |
| 2011/0065490 A1 | 3/2011 | Lutnick et al. |
| 2011/0066534 A1 | 3/2011 | Davie et al. |
| 2011/0130189 A1 | 6/2011 | Asher et al. |
| 2011/0256922 A1* | 10/2011 | Amaitis .................. G06Q 40/00 463/25 |
| 2011/0275432 A1 | 11/2011 | Lutnick et al. |
| 2012/0066149 A1 | 3/2012 | Davie et al. |
| 2012/0221456 A1* | 8/2012 | Lutnick .................. G06Q 40/04 705/37 |
| 2012/0231865 A1 | 9/2012 | Asher et al. |
| 2012/0231871 A1 | 9/2012 | Asher et al. |
| 2012/0302334 A1 | 11/2012 | Amaitis et al. |
| 2013/0005448 A1 | 1/2013 | Amaitis et al. |
| 2013/0012303 A1 | 1/2013 | Asher et al. |
| 2013/0102372 A1 | 4/2013 | Lutnick et al. |
| 2013/0203477 A1 | 8/2013 | Manning et al. |
| 2018/0174232 A1 | 6/2018 | Asher et al. |
| 2020/0051364 A1 | 2/2020 | Amaitis et al. |

FOREIGN PATENT DOCUMENTS

| | | |
|---|---|---|
| CA | 2564305 | 11/2018 |
| EP | 1 139 245 A1 | 3/2000 |
| EP | 1 234606 A1 | 8/2002 |
| GB | 1574447 | 9/1980 |
| GB | 2180675 A | 4/1987 |
| GB | 2299425 A | 10/1996 |
| JP | H07-226813 | 8/1995 |
| JP | 9-511593 | 11/1997 |
| JP | 10-222726 | 8/1998 |
| JP | 10-277269 | 10/1998 |
| JP | 11-073576 | 3/1999 |
| JP | 11-347200 | 12/1999 |
| JP | 2000-000372 | 1/2000 |
| JP | 2000-024324 | 1/2000 |
| JP | 2001-523869 | 11/2001 |
| JP | 2002-23780 | 1/2002 |
| JP | 2002-41809 | 2/2002 |
| JP | 2002-085851 | 3/2002 |
| JP | 2003-505793 | 2/2003 |
| JP | 2003-062336 | 3/2003 |
| JP | 6353579 | 6/2018 |
| WO | WO 98/04991 | 2/1998 |
| WO | WO/1999/026204 | 5/1999 |
| WO | WO 99/60498 | 11/1999 |
| WO | WO 00/79442 A1 | 12/2000 |
| WO | WO 2001/055941 | 8/2001 |
| WO | WO 2001/065908 | 9/2001 |
| WO | WO 01/77964 A2 | 10/2001 |
| WO | WO 01-83058 | 11/2001 |
| WO | WO 01/86532 A1 | 11/2001 |
| WO | WO 2003/093921 | 11/2003 |
| WO | WO 2004/079671 A2 | 9/2004 |
| WO | WO 2005/032675 | 4/2005 |
| WO | WO 2005/093628 | 6/2005 |
| WO | WO 2005/065065 | 7/2005 |
| WO | WO 2005/088509 | 9/2005 |
| WO | WO 2008/067596 | 6/2008 |
| WO | WO 2008/067604 | 6/2008 |
| WO | WO 2008/069827 | 6/2008 |
| WO | WO 2008/069828 | 6/2008 |

OTHER PUBLICATIONS

K. T. Ng and Y. M. Siu, "The development of a betting system on the Internet," Proceedings International Conference on Information Technology: Coding and Computing (Cat. No.PR00540), Las Vegas, NV, USA, 2000, pp. 308-311 (Betting) (Year: 2000).*
U.S. Appl. No. 10/654,280, dated Sep. 2003 Asher et al.
U.S. Appl. No. 10/794,666, dated Mar. 2004, Davie et al.
U.S. Appl. No. 10/794,668, dated Mar. 2004, Davie et al.
U.S. Appl. No. 10/795,163, dated Mar. 2004, Davie et al.
U.S. Appl. No. 10/837,077, dated Apr. 2004, Amaitis et al.
U.S. Appl. No. 10/836,999, dated Apr. 2004, Amaitis et al.
U.S. Appl. No. 11/018,978, dated Dec. 2004, Amaitis et al.
U.S. Appl. No. 11/467,047, dated Aug. 2006, Amaitis et al.
U.S. Appl. No. 11/535,662, dated Sep. 2006, Amaitis et al.
U.S. Appl. No. 11/536,059, dated Sep. 2006, Amaitis et al.
U.S. Appl. No. 11/536,094, dated Sep. 2006, Amaitis et al.
U.S. Appl. No. 11/745,573, dated May 2007, Asher et al.
U.S. Appl. No. 11/745,646, dated May 2007, Asher et al.
U.S. Appl. No. 11/963,088, dated Dec. 2007, Amaitis et al.
U.S. Appl. No. 11/963,158, dated Dec. 2007, Amaitis et al.
U.S. Appl. No. 12/032,141, dated Feb. 2008, Alderucci et al.
U.S. Appl. No. 12/032,160, dated Feb. 2008, Alderucci et al.
U.S. Appl. No. 12/563,985, dated Sep. 2009, Amaitis et al.
U.S. Appl. No. 12/726,954, dated Mar. 2010, Davie et al.
U.S. Appl. No. 12/947,702, dated Nov. 2010, Davie et al.
U.S. Appl. No. 13/615,491, dated Sep. 2012, Asher et al.
U.S. Appl. No. 13/619,977, dated Sep. 2012, Amaitis et al.
U.S. Appl. No. 11/841,049, dated Aug. 2007 Amaitis et al.
The Patent Office Search Report from International Application No. GB 0320232.2, 6 pages, dated Dec. 17, 2003.

(56) References Cited

OTHER PUBLICATIONS

NTRA All-Star Jockey Championship Special Wagers, 3 pages; date unknown.
"Wagering Information; Straight or Basic Wagers," Lone Star Park at Grand Prairie: Player's Guide, http://www.1onestarpark.com/bet_info.asp, 3 pages; date unknown.
"Wagering Information; Straight or Basic Wagers," NTRA.com, http://www.ntra.com/news.asp?type=playthehorses&id=4799, 3 pages; date unknown.
"Glossary of Terms," NTRA.com, http://www.ntra.com/news.asp?type=playthehorses&id=4797, 3 pages; date unknown.
"The Basics of Horseplay," NTRA.com, http://www.ntra.com/news.asp?type=playthehorses&id=4795, 2 pages; date unknown.
"Bet With the People Who Know Racing," Racing Daily Forum, 15 pages. Jul. 24, 2001.
"Quote of the Day; Bet of the Day," London Times, 1 page. Jul. 30, 2003.
TradeSports Trading & Betting Exchange, Best Lines & Bonuses, "What is Tradesports?," www.tradesports.com, 2 pages, Apr. 27, 2004.
PCT Notification of Transmittal of the International Search Report and the Written Opinion of the International Searching Authority, or the Declaration for International Application No. PCT/US05/46927, 9 pages. dated Jun. 19, 2006.
PCT Notification of Transmittal of the International Search Report and the Written Opinion of the International Searching Authority, or the Declaration for International Application No. PCT/US04/10028, dated Jun. 23, 2006, 6 pages.
Ozgit, A.; "Performance Based Sports Derivatives: A New Instrument"; Chapter 3; pp. 83-121 (date unknown).
Sauer, Raymond D.; "The Economics of Wagering Markets"; Journal of Economic Literature, vol. 36, No. 4; pp. 2021-2064, Dec. 1998.
Savage, Sam L.; "Prices, Probabilities and Predictions"; OR/MS Today; 10 pages. Jun. 2004.
Notification of Transmittal of the International Search Report and the Written Opinion of the International Searching Authority for International Application No. PCT/US05/15001; 10 pages. dated Sep. 13, 2007.
Australian Examiner's Report for Application 2004227808; 2 pages; dated May 16, 2008.
Notification of Transmittal of the International Search Report and the Written Opinion of the International Searching Authority for International Application No. PCT/US05/15129; 8 pages. dated May 28, 2008.
Random Walk Theory; http://www.streetauthority.com/tenns/r/random-walk-theory.asp; 3 pages; date unknown.
Welcome to binarybet.com; binarybet.com; 1 page; Date: 2003.
What is a Binary Bet?; binarybet.com; 1 page; Date: 2003.
Frequently Asked Questions; binarybet.com; 1 page; Date: 2003.
Fixed Odds Financial Betting; http://web.archive.org/web/200203291 10541 Ihttp://betonmarkets.corn/; 2 pages; May 10, 2005.
Notification of Transmittal of the International Search Report and the Written Opinion of the International Searching Authority for International Application No. PCT/US2005/006853; 13 pages. dated May 10, 2005.
Finspreads-Aboutfinancial spread betting, Wayback Machine, Dec. 24, 2008, pp. 1-12 ("Finspreads").
Tulloch, Freddie, "Financial Spread Betting," Derivatives Use, Trading, & Regulations, London: 2003, vol. 9, Iss. 1, p. 28, 5 pgs. "There was time when financial spread betting was just a way to "punt" on the financial markets, purely a gambling product with wide spreads and odds firmly in the bookmaker's favour," Sunday Business, London (UK), Nov. 30, 2003, p. 1.
Trading Places: Even in difficult Financial times there are still ways for the on-line investor to make money. Niki Chesworth, Evening Standard p. 68, Nov. 26, 2001.
Online Spread Betting: A Risky Business, Peter Temple, FT Epat May 1, 2002.
Australian Examiner's Report for Application 2005220915, dated Dec. 10, 2009 (2 pages).
Australian Examiner's Report for Application 2005241468 dated Jan. 12, 2010 (3 pages).
Australian Examiner's Report for Application 2005226038 dated Jan. 8, 2010 (2 pages).
Australian Examiner's Report for Application 2005220917, dated Jan. 8, 2010 (2 pages).
Australian Examiner's Report for Application 2007286823, dated Jun. 1, 2010 (4 pages).
Japanese Office Action with English translation for Application No. 2007-501964, dated Jul. 27, 2010 (7 pages).
Japanese Office Action with English translation for Application No. 2007-502051, dated Jul. 27, 2010 (7 pages).
Richard Dyson, "Spread Betting Lures British Investors in Game of Risk," Knight Ridder Tribute Business News, Mar. 31, 2002, p. 1 (2 pages).
Japanese Office Action with English translation for Application No. 2007-502044, dated Aug. 31, 2010 (6 pages).
International Preliminary Report on Patentability for International Application No. PCT/US05/46927, dated Jun. 26, 2007 (7 pages).
International Preliminary Report on Patentability for International Application No. PCT/US04/10028, dated Aug. 22, 2006 (4 pages).
International Preliminary Report on Patentability for International Application No. PCT/US04/10028, dated Oct. 18, 2006 (4 pages).
International Preliminary Report on Patentability for International Application No. PCT/US05/15001, dated Nov. 23, 2007 (5 pages).
International Preliminary Report on Patentability for International Application No. PCT/US05/15129, dated Feb. 24, 2009 (6 pages).
International Preliminary Report on Patentability for International Application No. PCT/US2005/006853, dated Sep. 5, 2006 (7 pages).
Japanese Office Action with English translation for Application No. 2007-511049, dated Sep. 21, 2010 (7 pages).
Around the World in Eighty Days, United Artists, 1956 (Wikipedia description attached), downloaded Dec. 13, 2010 (8 pages).
Australian Examiner's Report for Application 2009243500, dated Feb. 15, 2011 (3 pages).
www.financial-spreadbetting.com/—Financial Spread Betting, A Trader's Guide, URL: http://web.archive.org/web/20040127223015/http://www.financial-spread-betting.com/ Jan. 27, 2004.
European Communication and Supplementary Search report for Application No. 07841129.5, dated May 3, 2011 (7 pages).
Japanese Office Action with English translation for Application No. 2007-501964, dated May 17, 2011 (4 pages).
Japanese Office Action with English translation for Application No. 2007-502051, dated May 17, 2011 (7 pages).
Japanese Office Action with English translation for Application No. 2007-502044, dated Jun. 7, 2011 (5 pages).
Notification of Transmittal or Search Report and Written Opinion of the ISA or the Declaration for International Application No. PCT/US07/76368, dated Sep. 15, 2008 (6 pages).
International Preliminary Report on Patentability for International Application No. PCT/US07/76368, dated Feb. 24, 2009 (7 pages).
International Preliminary Report on Patentability for International Application No. PCT/US05/07219, dated Sep. 5, 2006 (5 pages).
International Preliminary Report on Patentability for International Application No. PCT/US05/07199, dated Sep. 5, 2006 (5 pages).
Australian Notice of Acceptance for Application 2005220915, dated Sep. 8, 2011 (3 pages).
USPTO Pre-Brief Appeal Conference Decision for U.S. Appl. No. 11/536,059, filed Oct. 11, 2011 (4 pages).
Australian Examiner's Report for Application 2005241468, dated Oct. 11, 2011 (2 pages).
Canadian Examiner's Report for Application 2,661,630, dated Oct. 13, 2011 (2 pages).
European Supplementary Search report for Application No. 04758725.8, dated Oct. 10, 2011 (1 page).
USPTO BPAI Decision for U.S. Appl. No. 11/535,662, filed Dec. 1, 2011 (6 pages).
Canadian Examiner's Report for Application 2521222, dated Dec. 15, 2011 (3 pages).
Japanese Notice of Allowance for Application No. 2007-511049, dated Dec. 27, 2011 (3 pages).

(56) References Cited

OTHER PUBLICATIONS

European Communication and Supplementary Search Report for Application No. 05737600.6, dated Feb. 2, 2012 (3 pages).
European Communication and Exam Report for Application No. 05724708.2, dated Mar. 13, 2012 (5 pages).
Australian Examiner's Report for Application 2011235977, dated May 8, 2012 (2 pages).
Canadian Examiner's Report for Application 2,558,675, dated May 24, 2012 (4 pages).
European Communication for Application No. 05737600.6, dated Jul. 26, 2012 (3 pages).
European Communication for Application No. 04758725.8, dated Oct. 15, 2012 (5 page).
Japanese Office Action with English translation for Application No. 2007-502044, dated Sep. 11, 2012 (5 pages).
European Communication for Application No. 07841129.5, dated Apr. 30, 2012 (7 pages).
Japanese Office Action with English translation for Application No. 2009-525727, dated Oct. 17, 2012 (14 pages).
Canadian Examiner's Report for Application 2,661,630, dated Mar. 25, 2013 (2 pages).
Australian Examiner's Report for Application 2012247034; 3 pages; dated Jun. 28, 2013.
Canadian Office Action for Application 2521222, dated May 14, 2013 (2 pages).
Australian Examiner's Report for Application 2011232742; 3 pages; dated May 7, 2013.
Japanese Office Action with English translation for Application No. 2009-525727, dated May 15, 2013 (6 pages).
Canadian Examiner's Report for Application 2,564,305, dated Apr. 17, 2013 (2 pages).
Canadian Examiner's Report for Application 2,558,402, May 14, 2013 (2 pages).
Japanese Office Action with English translation for Application No. 2011-222573, dated May 28, 2013 (6 pages).
Krigman, Alan, "Getting the Odds on Your Side at Roulette", posted on Jul. 14, 1997, http://krigman.casinocitytimes.com/article/getting-the-odds-on-your-side-at-roulette-5365.
Canadian Examiner's Report for Application 2,564,305, dated Feb. 24, 2014 (3 pages).
Australian Examiner's Report for Application No. 2012204029, dated Jan. 6, 2014, 4 pages.
European Communication for Application No. 05737600.6, dated Jul. 30, 2013 (5 pages).
Canadian Examiner's Report for Application 2,558,407, dated Apr. 15, 2013 (2 pages).
Canadian Examiner's Report for Application 2,558,407, dated Jan. 10, 2014 (2 pages).
Australian Examiner's Report for Application No. 2012201113, dated Jan. 17, 2014, 6 pages.
Canadian Examiner's Report for Application 2,558,675, dated Feb. 10, 2014 (5 pages).
Canadian Examiner's Report for Application 2,558,402, dated Jan. 22, 2014 (2 pages).
Canadian Notice of Allowance for Application 2,661,630, dated Feb. 19, 2014 (1 page).

* cited by examiner

SYSTEM AND METHOD FOR OFFERING INTRADAY WAGERING IN A FINANCIAL MARKET ENVIRONMENT

CROSS REFERENCE TO RELATED APPLICATIONS

This application is a continuation of U.S. application Ser. No. 13/099,954 filed May 3, 2011 entitled "SYSTEM AND METHOD FOR OFFERING INTRADAY WAGERING IN A FINANCIAL MARKET ENVIRONMENT" which is a continuation of U.S. application Ser. No. 12/726,954, filed on Mar. 18, 2010 (now U.S. Pat. No. 7,937,318 issued on May 3, 2011), entitled "SYSTEM AND METHOD FOR OFFERING INTRADAY WAGERING IN A FINANCIAL MARKET ENVIRONMENT," which is a continuation of U.S. application Ser. No. 10/795,163, filed Mar. 5, 2004 (now U.S. Pat. No. 7,711,628 issued on May 4, 2010), entitled "SYSTEM AND METHOD FOR OFFERING INTRADAY WAGERING IN A FINANCIAL MARKET ENVIRONMENT," all of which are incorporated herein by reference in their entireties.

TECHNICAL FIELD OF THE INVENTION

This invention relates in general to gaming and, more particularly, to a system and a method for wagering in a financial market environment.

BACKGROUND OF THE INVENTION

The gaming industry has experienced a tremendous increase in popularity over the last few decades. Excitement is generally derived from the expectation of potential future winnings based on the movements of the underlying event of the wager. Concurrently, in the financial market a different group of participants engage in allocating money based on the likelihood of some future event. Such participants (or investors) may purchase commodities (e.g. common stock through a trading exchange) in hopes that their purchases will appreciate with time. When the investor elects to close or sell his position, a profit may be obtained in cases where the underlying asset has grown in value.

Investors are also given the opportunity in today's trading markets to purchase equities that track a particular type of stock, sector, or exchange. For example, an investor may take a position in a stock that tracks the performance of semiconductors, cyclicals, or small-cap stocks (e.g. the Russell 2000). In another example, investors are given the opportunity to purchase a stock that tracks the performance the NASDAQ exchange (e.g. stock ticker symbol 'QQQ'). Gains or losses in the NASDAQ are, therefore, reflected by the tracking stock.

Investors may use any number of theories in order to develop a hypothesis for taking a position in such stocks. For example, because the NASDAQ is heavily weighted toward technology, an investor who feels that the technology sector is due for a rally may opt to take a position in the tracking stock of the NASDAQ. Other investors may use a technical analysis (considering factors such as momentum, volume, and performance graphs) to determine whether or not such an investment would produce a profit. Still other investors may use interest rates, bond prices, or any other appropriate factor as a basis for making such determinations. Alternatively, some investors may simply allocate capital based on pure guesswork and hunches. Accordingly, such a forum offers the opportunity for great speculation amongst participants, as any number of factors and theories may be implemented in an attempt to predict the future performance of an underlying asset.

SUMMARY OF THE INVENTION

From the foregoing, it may be appreciated by those skilled in the art that a need has arisen for an improved gaming instrument that provides for enhanced flexibility and improved wagering opportunities for participating customers and clients. In accordance with an embodiment of the present invention, a system and a method for wagering in a financial market environment are provided that substantially eliminate or greatly reduce disadvantages and problems associated with conventional gaming or investment approaches and instruments.

According to an embodiment of the present invention, a method for wagering in a financial market environment is provided that includes presenting an opportunity to make a wager that is based on a moving market line associated with a financial market. An end user is given an opportunity to bet on whether a financial market value will be above or below the moving market line at a designated time. The wager may be accepted from the end user. The wager may be monitored in order to determine whether the financial market value was above or below the moving market line at the designated time.

According to another embodiment of the present invention, a method for determining odds for a wager in a financial market environment is provided that includes generating market line odds associated with a wager, the market line odds for the wager being based on, at least, a volatility factor, a time factor, and a market line associated with a financial market. The market line odds may be provided to an end user interested in participating in the wager. The end user is given an opportunity to bet on whether a financial market value will be above or below the market line at a designated time. The wager may be settled based on the market line odds after the designated time in order to resolve whether the end user is entitled to a credit or a debit.

In yet another embodiment of the present invention, a method of providing multiple wagering opportunities in a financial market environment is provided that includes offering a first and a second wager that are each based on a moving market line associated with a financial market. The first wager is associated with a rise in a financial market value such that it will be above the moving market line at a first designated time interval within a trading session associated with the financial market, the second wager being associated with a decline in the financial market value such that it will be below the moving market line at a second designated time interval within the trading session. A selected one or both of the wagers may be accepted from one or more end users. The wagers may be monitored in order to determine whether the financial market was above or below the moving market line.

In a more particular embodiment of the invention, a third and a fourth wager are offered that are each based on a high line that corresponds to an increase in the moving market line. The third wager is associated with a rise in the financial market value such that it will be above the high line at a third designated time interval within the trading session associated with the financial market value, the fourth wager being associated with the financial market value being below the high line at a fourth designated time interval within the trading session.

In addition, a fifth and a sixth wager may be offered that are each based on a low line that corresponds to a decrease in the moving market line. The fifth wager is associated with a decline in the financial market value such that it will be below the low line at a fifth designated time interval within the trading session, the sixth wager being associated with the financial market value being above the low line at a sixth designated time interval within the trading session.

Additionally, a seventh and an eighth wager may be offered that are each based on a spread line that corresponds to a derivation above and below the moving market line. The seventh wager is associated with the financial market value being below the spread line at a seventh designated time interval within the trading session, the eighth wager being associated with the financial market value being above the spread line at an eighth designated time interval within the trading session.

Certain embodiments of the present invention may provide a number of technical advantages. For example, according to one embodiment of the present invention, a gaming instrument is provided that allows potential investors or bettors to participate in betting on the movement of financial markets. The existence of a dynamic instrument, which offers a moving line variable for the placed bet, provides an opportunity for investors and gamers to bet on a number of potential fluctuations in an underlying market. Accordingly, clients may bet that the market will close above or below the moving line value and also enjoy additional betting opportunities where they may bet that the market will close above or below predetermined levels that are (for example) circa 1% above and below the actual market value.

In addition, the value of a financial transaction may now be wagered according to odds that are dynamically determined based on the underlying market levels and any additional data that may be relevant or useful in making such a determination. Included in the current wagering architecture is a spread around the current market value (i.e. the moving middle market value line). The spread may offer odds that are better than those relating to the non-spread market lines and, further, could be provided with even money odds. Such a wagering system may be implemented in cooperation with any number of securities and exchanges that experience any degree of movement.

Yet another advantage of an embodiment of the present invention is an augmentation in betting opportunities as a result of the use of multiple intraday expiries. This characteristic offers an even greater selection for a potential participant in the gaming system. Certain bets may include a daily expiry or be provided with weekly and quarterly expiries. Other bets could extend to minute-by-minute expiries. On this basis, customers, investors, and clients could have the opportunity to bet on multiple occasions throughout the course of the trading day. Thus, in its least ambitious state, the financial markets now become a foundation for regular intraday betting activity in the same way that horseracing and other sportsbook events present multiple daily betting opportunities (e.g. a bet expiry every half hour throughout the day) for an end user.

Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION

Figure 1:
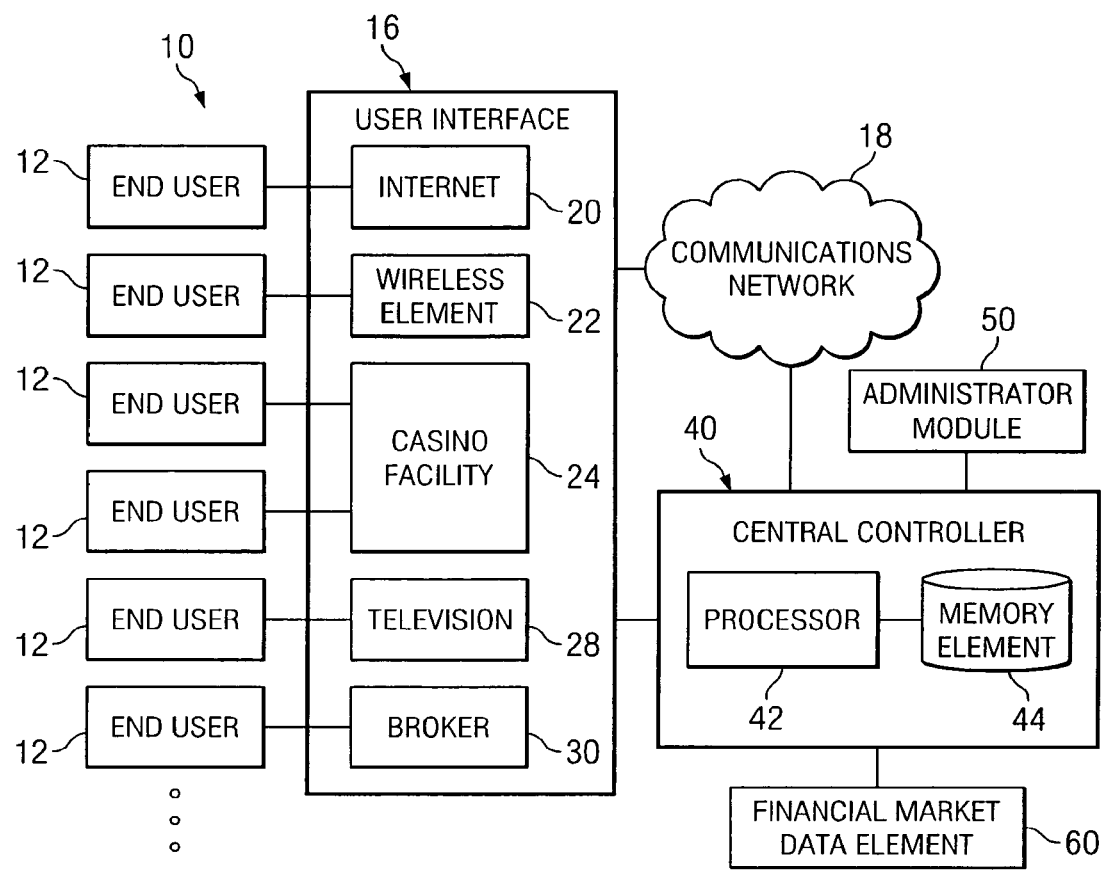
FIG. 1 is a simplified block diagram of a gaming system for wagering in a financial market environment in accordance with an embodiment of the present invention.

FIG. 1 is a simplified block diagram of a gaming system 10 that offers an opportunity for wagers to be placed in a financial market environment. Gaming system 10 comprises multiple end users 12, a user interface 16, a communications network 18, and a central controller 40. Gaming system 10 may also include an administrator module 50 and a financial market data element 60. User interface 16 may include a number of elements that offer connectivity for one or more end users 12 to other elements within gaming system 10. These elements may include an Internet 20, a wireless element 22, a casino facility 24, a television (or display) 28, and a broker 30. Central controller 40 may include a processor 42 and a memory element 44.

In accordance with the teachings of the present invention, gaming system 10 provides increased flexibility and improved opportunities for diversification in wagering in a number of financial markets. Gaming system 10 offers financial odds for moving line markets and, further, is capable of providing bets that include multiple intraday expiries. Gaming system 10 further offers a pricing engine that is operable to determine: 1) a set of moving fixed odds around static market lines; 2) a correct moving market line in relation to static odds; and 3) an ability to receive betting information in order to display liability management in relation to the financial fixed odds betting activity.

Some financial products may display odds around a static line that will be unchanged throughout the trading day. In contrast to such architectures, gaming system 10 offers a wagering platform that is capable of offering bets associated with a dynamic market, where the market line is a reflection of the current market levels. The market line may move constantly throughout a given trading day and reflect underlying market shifts and movements.

A given end user 12 may bet that a selected market (e.g. the FTSE) will close at a value that is above or below the moving line value. End users 12 may also enjoy additional betting opportunities based on the theory that the market will close above or below levels that are (for example) approximately 1% above or below the actual market value. Thus, gaming system 10 may include a spread around the current market value (i.e. the moving middle market value line), whereby the spread includes odds that are better (from the perspective of the bettor) than those relating to the non-spread market line. Such odds may be effectively even, as opposed to (for example) 10/11 type odds.

Daily expiries, as well as other intraday and longer-term expiries, may also be accommodated by gaming system 10. Bets may be placed in any suitable financial market, such as the FTSE, the German DAX, the French CAC, the NAS-DAQ, the American Exchange (AMEX), the New York Stock Exchange, the Nikkei, the bond or treasury markets, and the Hang Seng Index, for example. Thus, gaming system 10 may facilitate frequent bet expiries in relation to any number of suitable financial instruments. Bets could also extend to minute-by-minute or thirty-second expiries. On this basis, end users 12 can have the opportunity to bet on multiple events/scenarios throughout the trading day. Accordingly, a targeted financial market can represent a foundation for regular intraday betting activity.

Other example applications may include provisions for a bet expiry every five minutes throughout market hours (and readily extended to accommodate defined future time frames). In an example scenario, where it is assumed that an expiry is present every five minutes, then wagering opportunities could be defined for the FTSE market (in GMT times) as follows: (Opening Bell) 10.00 am, 10.05 am, 10.10 am, 10.15 am, etc. and continuing to 17.05, 17.10, 17.15, 17.20 (Closing Bell).

Clients seeking to place bets could do so and specify an expiry that they have elected. This will probably be the imminent forthcoming expiry, but later ones can also be easily accommodated. Hence, a client in a betting shop or in an on-line environment has a betting opportunity every minute throughout the day. Settlement could subsequently follow the bet expiry in any suitable manner (e.g. immediately without delay after the expiration).

A further capability provided by gaming system 10 is the provision for a non-time specified expiry. In such a scenario, a bet expires at a defined delay from the moment the bet was struck. This would allow end user 12 to place a bet at any time throughout the day knowing that the bet, which was placed, will expire (for instance) five minutes after the bet was placed (e.g. a bet placed at 12.07 and 35 seconds: bet settled at 12.12 and 35 seconds). Thus, bets would not necessarily expire for all participants at nominated intervals, but instead expire on a defined post (i.e. delayed) basis.

Another capability that flows from the arrangement of gaming system 10 is that sophisticated participants would be able to continually adjust their overall risk participation or exposure: for instance, by betting one way in an individual transaction and taking the opposite position with respect to the outcomes of a plurality of other events. For example, a participant might first wager that the NASDAQ will appreciate in price, but also take a short position in the Russell 2000. Such a blended risk-participation strategy allows participants to effectively balance or hedge their wagers and their betting portfolio in a manner similar to an investor hedging an investment portfolio by offsetting trading in the underlying securities.

End users 12 are clients, customers, prospective investors, or entities wishing to place a wager. End users 12 may also seek to access or to initiate a communication with user interface 16 that may be delivered via communications network 18. End users 12 may review data (such as performance characteristics) associated with a particular market in order to take a position (place a wager) in any given financial target. Alternatively, end users 12 may represent any device or object that seeks to initiate a communication on behalf of another entity or element, such as a program, a database, or any other component, device, element, or object capable of initiating a voice or a data exchange within gaming system 10. Data, as used herein in this document, refers to any type of numeric, voice, or script data, or any other suitable information in any appropriate format that may be communicated from one point to another.

End user 12 may participate in a wager, which represents the legal instrument that may be used to bind end user 12 to a stipulated agreement. A wager may take any appropriate form such as a written document, an e-mail, a facsimile message, a computer display, an entry in an account, or a verbal agreement between two parties. Such a wager is flexible in its terms, representations, and stipulations. In general, any information or data that may be germane or of interest to a betting participant or a hosting entity may be included in a wager, provided that the included terms are mutually agreeable to the two (or more) parties bound by the wager.

User interface 16 is an architecture that facilitates wagering on a selected financial market. User interface 16 is operable to receive and to process requests associated with transactions relating to a wager. User interface 16 provides a portal for end users 12 to access other elements of gaming system 10. User interface 16 may be a computer, a server, a management center, a single workstation, or a headquartering office for any person, business, or entity that seeks to manage or facilitate wagering activity. Accordingly, user interface 16 may include any suitable hardware, software, personnel, devices, components, elements, or objects that may be utilized or implemented to achieve such operations and functions in a gaming environment.

In one example embodiment used for purposes of teaching only, user interface 16 comprises any one or more of a selection of elements that includes Internet 20, wireless element 22, casino facility 24, television 28 (e.g., cable, satellite, closed-circuit, etc.), and broker 30. Any suitable number and combination of interfaces may be implemented in gaming system 10 according to usage, traffic, architecture, and other considerations.

Alternatively, user interface 16 (and the examples thereof) may be replaced with any other suitable interface or object that facilitates communications between end user 12 and any other element within gaming system 10, such as: a cellular telephone, an electronic notebook, a personal digital assistant (PDA), or any other suitable device (wireless or otherwise), component, or element capable of accessing one or more elements within gaming system 10. The end user interface may also comprise any suitable interface for a human user such as a display, a microphone, a keyboard, or any other appropriate terminal equipment according to particular configurations and arrangements. In addition, the end user interface may be a unique element designed specifically for communications involving a wager. Such an element may be fabricated or produced specifically for financial applications involving end user 12.

User interface 16 may be owned and operated by any suitable entity having the ability and/or authority to operate in the gaming industry. A direct connection may be present between user interface 16 and any other financial exchange, whereby information associated with the exchange is delivered to end user 12 and may be reviewed before executing the transaction. Thus, user interface 16 may deliver real-time financial data to end user 12 in order to provide pertinent financial information to be used to make decisions as to whether to purchase or to sell a wager. This financial information may be retrieved from financial market data element 60 or any other suitable element, such as the direct connection described above. Financial market data element 60 may relay data, such as pricing information, market lines, maturity data, financial graphs and charts, historical quotes, or moving averages, for example, to end users 12. Other pertinent financial data may also be readily delivered and based on particular needs. In order to deliver information that is accurate and timely, financial market data element 60 may be coupled directly to a corresponding exchange communications link that carries such financial data. Alternatively, financial market data element 60 may gather such critical information from any appropriate location (e.g. a news wire or a server operable to deliver real-time information to investors) such that the desired data is delivered to end user 12.

User interface 16 may also include one or more self-service betting machines. In some embodiments, self-service betting machines allow end users 12 to insert payment into a machine (such as cash or by using a voucher or a credit/debit card), place one or more bets, and receive a printout (such as a ticket, for example) confirming that the bet was placed. Printouts for winning bets may be inserted back into the self-service betting machine to receive a payment or a voucher (which may be used to receive a payout from a teller). In other embodiments, self-service betting machines allow end users 12 to use a credit card, a debit card, or a smart card to place bets. The credit or debit card may have an associated account, which may be a betting account provided and/or managed by a betting account provider using, for example, a centralized computer system. The account may also be stored in an end-user profile, such as that which is described below with reference to FIG. 3. The smart card may itself store information regarding a betting account and various bets. In some embodiments, after the expiration of the bet, end user 12 may insert or swipe his or her credit, debit, or smart card in the self-service betting machines in order to update the balance on the card.

Figure 3:
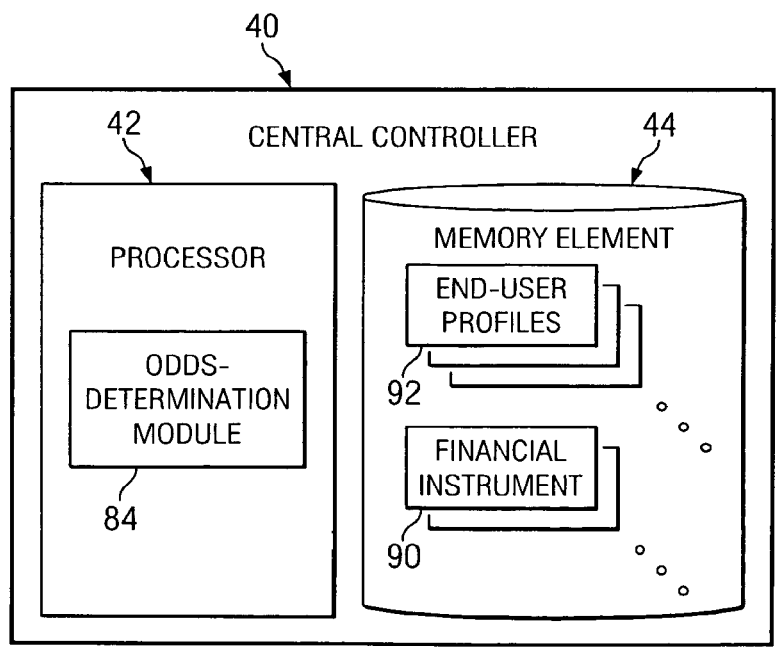
FIG. 3 is a simplified block diagram of a central controller that may be included within the gaming system.

User interfaces 16 may also include various non-physical interfaces, such as one or more telephone operators and one or more websites. End users 12 may access or communicate with such non-physical interfaces in any appropriate manner. Telephone operators may communicate betting information to, and take bets from, end users 12. Similarly, websites may communicate betting information to end users 12 and allow end users 12 to place bets. One or more of such websites may be hosted by one or more servers associated with an owner or operator of gaming system 10. The Internet betting provider may provide Internet account wagering by providing online betting accounts to one or more end users 12. Using an online betting account, a client may interface with one or more websites associated with the Internet betting provider in order to fund the account, view betting information regarding betting events (e.g. odds), and place bets. Such online betting accounts may include one or more various types of accounts, such as deposit accounts, credit accounts, margin accounts, stop-loss accounts, and hybrid accounts, for example. Such accounts may be stored in an end-user profile (as illustrated in FIG. 3).

Communications network 18 is a communicative platform operable to exchange data or information between end user 12 and user interface 16. Communications network 18 represents an Internet architecture in a particular embodiment of the present invention, which provides end user 12 with the ability to electronically execute or initiate transactions associated with a wager. Alternatively, communications network 18 could be a plain old telephone system (POTS), which end user 12 could use to perform the same operations or functions. Such transactions may be assisted by broker 30 associated with user interface 16 or manually keyed into a telephone or other suitable electronic equipment in order to request that a transaction be executed. In other embodiments, communications network 18 could be any packet data network (PDN) offering a communications interface or exchange between any two nodes in gaming system 10. Communications network 18 may alternatively be any local area network (LAN), metropolitan area network (MAN), wide area network (WAN), wireless local area network (WLAN), virtual private network (VPN), intranet, or any other appropriate architecture or system that facilitates communications in a network or telephonic environment.

Central controller 40 includes processor 42 and memory element 44 in accordance with one example embodiment of the present invention. Central controller 40 is operable to receive requests from end user 12 and to process those requests such that financial transactions involving a wager are executed. The resultant wager that is generated may be suitably stored in memory element 44 after being properly managed and secured by processor 42. Processor 42 may also assist in processing any financial terms or conditions (e.g. desired expiration, type of exchange, odds parameters, etc.) requested by end user 12. In cases where central controller 40 is unable to match the requested financial parameters or tendered wager terms provided by end user 12 with that which is available in the market place, central controller 40 may contact end user 12 and notify end user 12 of the circumstances surrounding the inability to fulfill such a wager.

Processor 42 may comprise any suitable processor that executes a betting system application or other computer instructions that facilitate wagering. Processor 42 may be a CPU or a microprocessor and include any suitable number of processors working together. Processor 42 is generally operable to execute various algorithms, computations, or calculations to determine current bet data (such as bet amounts), betting odds and/or potential payout data. Processor 42 may determine such current bet data based on data received from memory element 44 and/or financial market data element 60. In addition, processor 42 may update such current bet data based on new information being received from financial market data element 60. In some embodiments, processor 42 may update current bet data in real-time, substantially in real-time, or at preset intervals (such as every thirty-five seconds, for example). In addition, processor 42 may perform the operations described herein to establish wagering odds. In other embodiments, odds are determined external to gaming system 10 and simply fed to central controller 40 from an external link.

Memory element 44 may comprise one or more memory devices that facilitate wagering (or that store information relating thereto), such as one or more random access memories (RAMs), read-only memories (ROMs), dynamic random access memories (DRAMs), fast cycle RAMs (FCRAMs), static RAM (SRAMs), field-programmable gate arrays (FPGAs), erasable programmable read-only memories (EPROMs), electrically erasable programmable read-only memories (EEPROMs), microcontrollers, or microprocessors. Memory element 44 is also generally operable to store data that may be used by processor 42 in determining odds and/or payouts.

It should be noted that the internal structure of central controller 40 is malleable and can be readily changed, modified, rearranged, or reconfigured in order to achieve its intended operations. Accordingly, central controller 40 may be equipped with any suitable component, device, application specific integrated circuit (ASIC), hardware, software, processor, algorithm, ROM element, RAM element, EPROM, EEPROM, or any other suitable object that is operable to facilitate the operations of central controller 40. Considerable flexibility is provided by the structure of central controller 40 in the context of gaming system 10.

In an alternative embodiment, user interface 16, communications network 18, and/or central controller 40 may be replaced entirely or partially with a person, providing a human interface between end user 12 and a wager involving a financial market. In such an embodiment, an agent of user interface 16 (or any other suitable person or representative) may be contacted by end user 12 (e.g. via the telephone, a network, other suitable electronic equipment, or directly by word of mouth). The agent or representative may receive a request from end user 12 to execute some transaction involving a wager. The agent or representative may then proxy or broker the request to an appropriate entity for execution of the wager. The agent or representative may then record the transaction once it has been consummated and subsequently contact end user 12 to confirm that the transaction has been executed. A receipt (of any suitable type) may then be issued to end user 12 indicating the terms of a wager. Additional details relating to the internal structure of central controller 40 are provided below with reference to FIG. 3.

Administrator module 50 is an element that cooperates with central controller 40 in order to ensure a fair and proper execution of wagering transactions initiated by end user 12. Administrator module 50 is an optional component of gaming system 10. Administrator module 50 may be used in certain embodiments to control any operation of central controller 40. For example, administrator module 50 may be used to manually set betting odds, to approve margin requests, or to halt specific wagering activities. In selected instances, administrator module 50 may call for additional margins throughout the day without waiting for a routine end-of-day settlement. In still other scenarios, administrator module 50 may be used for more simplistic monitoring functions.

Figure 2:
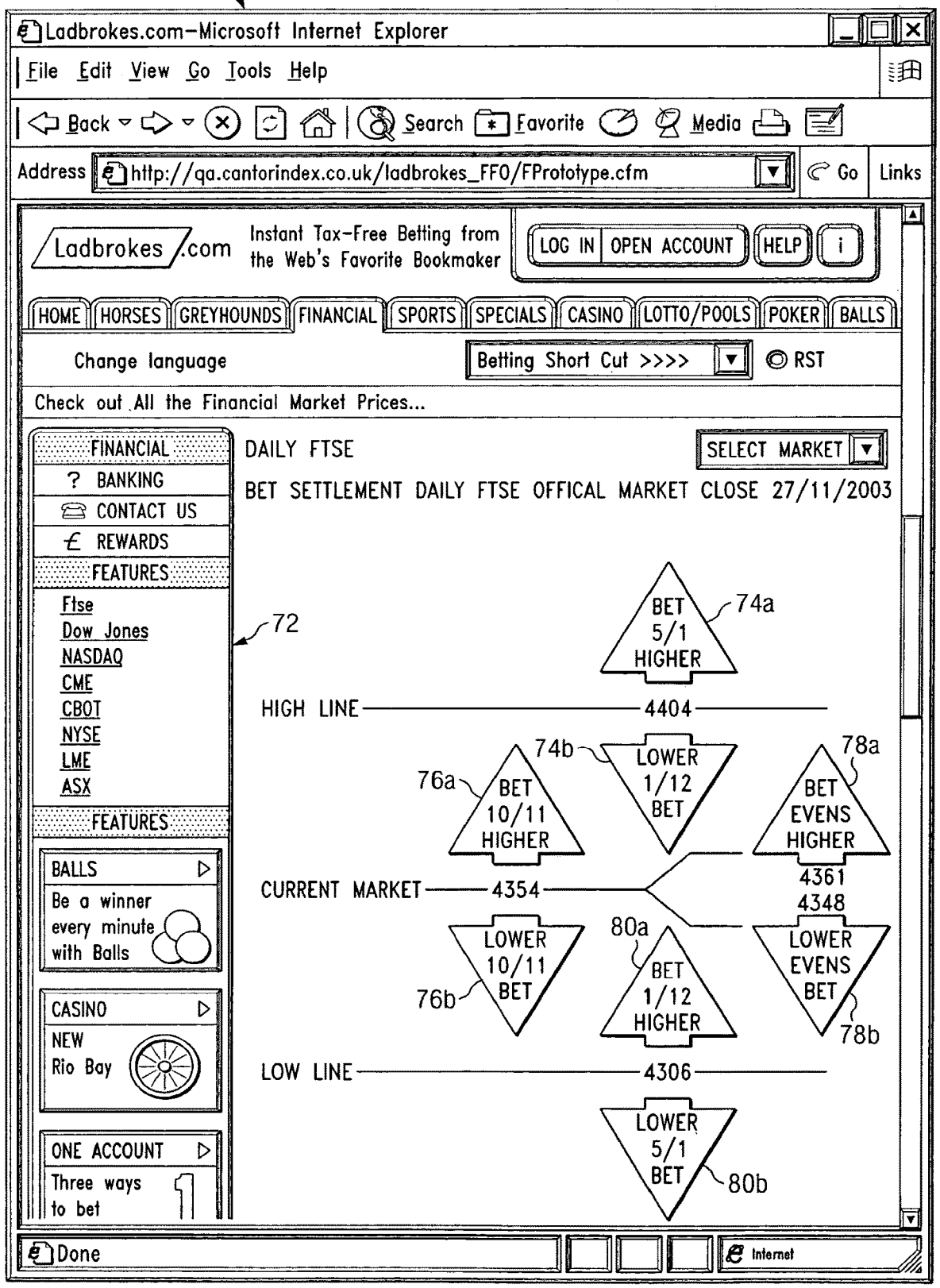
FIG. 2 is a simplified schematic diagram of an example screen page that may be included in the gaming system.

FIG. 2 is a simplified schematic diagram of an example screen page 70 in accordance with an embodiment of the present invention. Screen page 70 illustrates an opportunity for end user 12 to bet on whether selected markets will expire above or below defined market levels. The associated expirations can be variable. In an example scenario used for purposes of teaching and example, the expiry is daily at the market closing bell.

In the example of FIG. 2, eight betting opportunities are offered, whereby the web page represents bets that relate to one specific financial instrument. The eight available bets are based on the opportunity to bet that the specified market will close above or below four separately defined levels. A list 72 allows end user 12 to access any given exchange in order to place a potential bet associated with a given market line.

In an example embodiment, screen page 70 includes a high line, the current market line, and a low line for the FTSE. The high line is a constantly moving market level: about 1% of the market value above the current market level in this example. Note that in more volatile markets (or based on particular needs) such high and low lines may be ±any suitable percentage level of the middle market line. The high line in this example is at 4404. The higher and lower betting opportunities represent constant fixed odds prices. The higher odds will be odds against the current levels (a short position) and the lower odds will be odds for/supporting current levels (a long position or 'odds-on'). Thus, in an example arrangement, a set of bets 74a and 74b reflect the short and long positions for the high line. Bet 74a includes odds of 5/1, while bet 74b includes odds of 1/12.

The current market line is moving constantly, as a reflection of the actual market level. This is in relation to the higher or lower betting opportunities, which remain at static fixed odds prices (approximately 10/11 in this example). The current market line is 4354 and includes a set of bets 76a and 76b, which represent higher and lower positions that are both accompanied by 10/11 odds. Additionally, another set of bets 78a and 78b are provided at derivations of the current market line. These two bets are offered at levels of 4361 and 4348 respectively. Thus, a second current market level (in this case where customers can bet at even money) is provided and offers an opportunity to bet on whether the market will expire above or below a market spread. In this example, a thirteen point spread straddles the current market middle line and offers yet another betting opportunity for end user 12.

Screen page 70 also includes a low line. This represents a constantly moving market level that will be circa 1% (in this example) of the market value below the current market. The higher and lower betting opportunities reflect constant fixed odds prices in this example. The higher odds will be (long) odds-on and the lower odds will be (short) odds-against. Thus, a set of bets 80a and 80b are again provided, reflecting the higher and lower bets respectively. Additionally, the odds are 1/12 and 5/1 respectively for bets 80a and 80b. Other expiries may also be accommodated and inclusive of intraday markets, weekend markets, and monthly and/or quarterly expirations.

The high line and low line, in addition to reflecting market movements, will move over time. The spread between the high line and the market line will grow more narrow (or closer) as the expiry draws near. This is also true for the bet evens higher wager and the lower evens bet (bets 78a and 78b). Thus, such lines are floating: not only in the sense of market movements, but also as time progresses they will move and narrow. For example, with five minutes left to go for a wager, these lines will be quite narrow. Thus, the high line generally comes down (while odds remain relatively consistent) and the low line generally goes up during the course of the trading day. Note also that over time, as markets close, certain bets may be eliminated because of practical constraints. Markets generally move in whole number increments. Therefore, spreads that are too narrow will eliminate certain bets (e.g. bets 74b and 80a), as the markets draw to a close. This offers some constraint on such a scenario, whereby (for example) the high line and the low line cannot be any closer than five or ten ticks apart.

The 1/12 and 5/1 odds bets (bets 74b and 80a and 74a and 80b) reflect odds calculations that are determined based on their corresponding lines (i.e. 4404 and 4306). Thus, in an example wager, consider the case where end user 12 bets $100 that the FTSE will close above the high line (provided as 4404). This bet provides 5/1 odds (identified as bet 74a). At the end of the trading day in this example, assume the FTSE closes at 4425. This is a winning bet. Settlement would then ensue where end user 12 would collect $500 from the winning bet plus his original stake, which would yield $600 total. Using the same parameters, consider a second end user 12 that opts to wager on the lower bet. The lower bet offers 1/12 odds (identified as bet 74b). When the market closed above such a prediction (a losing bet), end user 12 would lose the $100 that he bet. If, on the other hand, the FTSE closed at 4390 in this scenario, end user 12 would be rewarded with $100/12 (the odds offered) plus his original stake. This would yield a return of approximately $108.33 for the winning bet.

As described above, the price that is being offered to end user 12, reflecting where the middle of the market is, can be provided by a communications feed. This feed could reflect daily market conditions and effectively encompass news flow and other financial parameters that could potential affect the market. Other embodiments, described more fully below, offer an owner or operator of gaming system 10 considerable flexibility in setting market lines and odds.

FIG. 3 is a simplified block diagram of an example internal structure of central controller 40, which may be included within gaming system 10. Central controller 40 comprises processor 42 coupled to memory element 44. Processor 42 may execute a number of applications to perform various features and functions for creating and settling a plurality financial instruments 90. Memory element 44 may store such applications, various incarnations of financial instruments 90, and/or any other relevant information associated with financial instruments 90. In a particular embodiment of the present invention, processor 42 includes an odds determination module 84 that is operable to establish a number of odds (explained more fully below) for end user 12 in the context of a number of wagering opportunities.

Financial instruments 90 are derived from a wager that is made with respect to the outcome of one or more events associated with a financial market. Financial events and parameters form the basis for financial instruments 90, which reflect wagers in selected markets. The events might involve the movement or the value of a financial market index, security, or other instrument during or at the end of a predetermined period of time, as described above. Such instruments may include all relevant financial data and obligation terms associated therewith.

In operation of an example embodiment, the movement of a financial market may be graphically represented on an electronic screen using symbols such as, for example, color-coded (e.g., red, green, or yellow) arrows. Each symbol could indicate whether the value of the associated financial market indicator was: 1) down during the last predetermined period of time or after the last relevant transaction or transactions (e.g., red down arrow); 2) up during the last predetermined period of time or after the last relevant transaction or transactions (e.g., green up arrow); or 3) unchanged during the last predetermined period of time or after the last relevant transaction or transactions (e.g., yellow horizontal arrow). Any suitable number and combination of symbols could represent a suitable portion of the history of, or the movement in, the value of the financial market.

Memory element 44 of central controller 40 may store information regarding the various types of different wagers that may be placed (and their outcomes) in gaming system 10. Memory element 44 may also store various financial instruments 90 and a plurality of end-user profiles 92. Memory element 44 may additionally store information associated with a financial instrument number (FIN), a description of the market(s) that are the subject of the particular wager, a designated duration/expiry, and odds established for the particular wager. These fields (and others) may be defined in numerous ways within the scope of the present invention. For example, the term 'expiry' may refer to a particular closing or settlement time and/or date for financial instrument 90 to close, or it may be based on the events themselves that may be completed at some arbitrary or specific date in the future (e.g. at the closing bell).

Additionally, each end-user profile 92 may include any relevant information associated with end user 12, his wagering activity, or his finances. For example, items such as account numbers, transactional history, balances, commissions, available funds, and potential debits/credits may be reflected in a profile. End-user profiles 92 may be pin-accessed by end user 12 or accessed solely by an entity or administrator authorized to do so.

Odds determination module 84 of processor 42 determines the odds provided to end user 12 for a particular wager. In one embodiment, the three factors considered in setting odds are the underlying market level, volatilities, and time. Volatility represents a measure of uncertainty exhibited by the market over a given time period. Markets generally follow log-normal distribution, which reflects an abstraction or theory that allows a person to reasonably approximate market movements. In this sense, the mathematics used to calculate odds could be similar to that of options pricing. In other scenarios, odds calculations may be based on exposure for an owner/operator of gaming system 10. Note that a number of control parameters are provided to an administer of gaming system 10. For example, the volatility factor may be manipulated in response to breaking news that would most likely affect market levels. This judgement may be made by an administrator and reflect his own judgment and/or expertise in market theories. In other scenarios, such news items would automatically be priced into the financial market.

In an alternative embodiment, odds determination module 84 determines odds for a particular wager based on the following formula: odds=(prize value/risk value)*factor. Therefore, odds could be variable based (at least in part) on the prize value and the risk value. In still other embodiments, odds determination module 84 may use or consider any number of influential factors to vary odds that are offered to end users 12. Any number of news items, statistical data, or events, may affect or influence a given market. These factors may be taken into consideration by an administrator in setting odds. Such factors may include market news or commentary, job data, interest rate information, commodity prices, consumer spending, consumer confidence, unemployment information, economic growth, capital spending, gross domestic product (GDP) data, bond prices, or any other piece of information or data that may have an influential effect on a given market line. For example, a decrease in interest rates generally spawns an increase in the Dow Jones Industrial Average (DJIA) for that trading day. Odds determination module 84 may calculate odds in a systematic manner (as described herein) and then factor in this information such that the odds are generally shifted to accommodate for the probability of gains in that day's market performance. In other embodiments, such information is built into the market line in a manner that is suitable to an administrator and, therefore, such manipulations are unnecessary.

In an example scenario, consider that the S&P 500 rarely performs poorly in an election year in the United States. Only twice in the history of the U.S. stock markets has the S&P 500 provided a negative return for investors during an election year. Thus, during an election year, control parameters may be implemented to reflect the proposition that, over the course of the year, the S&P 500 is most likely to rise. Similarly, markets tend to decline in times of war or during patterns of interest rate increases. In the event of a major war or in the event that such a pattern (of systematic interest rate increases) is identified, an administrator could again manipulate the odds (as he sees fit) to reflect this probable downward trend.

In still other scenarios, the odds associated with a market may be established based on the current market line in conjunction with the proportion of money bet on that market versus the total amount of money accumulated in the relevant betting pool. Because each set of odds corresponds to a percentage, each participant is also associated with a percentage. In order to form a group of participants for a bet without takeout, gaming system 10 can select participants from the field of participants whose percentages total an amount that corresponds to the odds. The percentage corresponding to the odds is also referred to as a target percentage. For example, for an even money bet (i.e., target percentage of 50%), if the lead participant of a group of participants has 5-2 odds and, therefore, is associated with a percentage of 28%, gaming system 10 may form the group of participants by selecting other participants whose percentages total 22%, such as a participant having 7-2 odds (22%); participants having 4-1 odds (20%) and 50-1 odds (2%); or participants having 7-1 odds (12%) and 9-1 odds (10%). In another example, for a bet having odds of 2-1 (i.e., target percentage of 33%), if the lead participant of a group of participants has 6-1 odds and, therefore, is associated with a percentage of 14%, gaming system 10 may form the group of participants by selecting other participants whose percentages total 19%, such as participants having 9-1 odds (10%) and 10-1 odds (9%); participants having 5-1 odds (16%) and 30-1 odds (3%); or a single other participant having 9-2 odds (18%) or 4-1 odds (20%).

As the number of participants in an event and the odds for particular participants in an event vary, it may be difficult to assemble a group of participants with a total percentage of exactly the target percentage. Therefore, an administrator of gaming system 10 may attempt to form a group of participants having a total percentage as close to the target percentage as possible. In a particular embodiment, gaming system 10 (e.g. via odds determination module 84) may establish a percentage threshold to be used to determine whether odds bets may be offered for a particular event. For example, gaming system 10 may establish a threshold that is three percentage points above or below the target percentage. In this example, gaming system 10 offers an odds bet if the total percentage for the group of participants is within three percentage points above or below the target percentage. Where no odds bet is established in this scenario, gaming system 10 may convert an odds bet into a straight odds bet for the lead participant. Gaming system 10 may attempt to form the group of participants using any suitable number and combination of participants in the field of end users 12.

Note that in still other scenarios, the market line may be static or fixed over a given time period, whereby the odds may be varied in order to tempt an end user or to solicit additional betting. For example, if the FTSE shoots up 300 points to a level of 5000 in morning trading, the odds can be varied significantly (e.g. 50/1 or 100/1) in order to entice people to bet that the FTSE will close below the original market line. This is an unlikely occurrence. Other unlikely occurrences (involving the appreciation or depreciation of corresponding markets) may be readily appreciated and are, thus, clearly within the scope of the teachings of gaming system 10.

In the example provided above, the original market line (when the FTSE opened) was 4700. Thus, if the FTSE were at a level of 5000, odds would have to be attractive enough to persuade a potential bettor to engage in a wagering opportunity involving a significant decline in the FTSE. Thus, long odds prices can be generated in order to lure punters (i.e. bettors) to bet. Market odds could be refreshed several times per day in order to provide new betting opportunities.

Odds determination module 84 may be employed in order to determine odds for this configuration. Additionally, administrator module 50 may also participate in such a process in order to establish appropriate odds or to refresh the gaming environment to offer new betting opportunities. In other scenarios, any suitable element within gaming system 10 may be implemented to achieve a static market line arrangement, inclusive of the ability to vary odds that are used to entice bettors.

Figure 4:
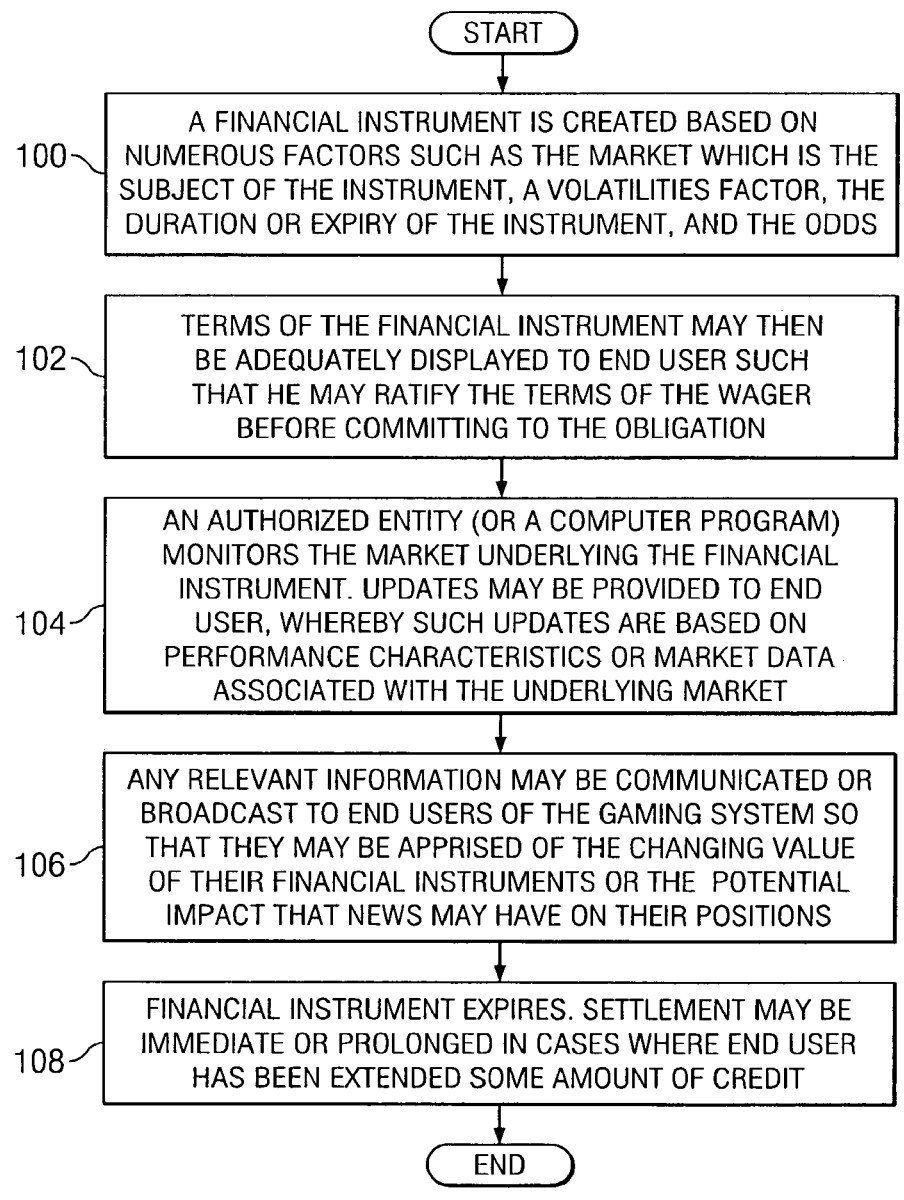
FIG. 4 is a flowchart illustrating a series of example steps associated with a method for wagering in a financial market environment.

FIG. 4 is a simplified flowchart illustrating a series of example steps associated with a method for wagering in a financial market environment. The method may begin at step 100 where financial instrument 90 is created based on numerous factors, such as the market line that is the subject of the instrument, a volatility factor, the duration or expiry of the instrument, and the corresponding odds. At step 102, the terms of financial instrument 90 may then be adequately displayed to end user 12 such that he may ratify the proposed wager before committing to the obligation.

At step 104, an authorized entity (or a computer program) may monitor the financial market value underlying financial instrument 90. Updates may be provided to end user 12, whereby such updates are based on real-time market data associated with those underlying financial markets. A given end user 12 may have a number of bets active at any given time. For example, end user 12 may be betting on an overall rise in the NASDAQ market (having a daily expiry), as well as a reduction (short position) in the German DAX (having a five-minute expiry).

At step 106, any relevant information may be broadcast to end users 12 of gaming system so that they may be apprised of the changing value of their financial instruments 90 or of news that may impact their positions. For example, market level data, employment numbers, and/or GDP statistics may be provided to end users 12. Other information provided may simply update the projected value of financial instrument 90 based on current market conditions. An administrator of gaming system 10 may ignore this information or use it to offer new betting opportunities for potential gamers. These opportunities may be readily displayed to end users 12 such that they may participate in even more wagering opportunities through gaming system 10.

At step 108, financial instrument 90 expires at a designated time interval. Settlement may be immediate (e.g. via a debit or credit to an end-user account) or prolonged in cases where end user 12 has been extended some amount of credit. In other cases (where the relationship between end user 12 and an administrator is more reliable), payments could be simply mailed or communicated electronically by an authoritative entity, or by end user 12 where a loss was incurred. Settlement may be achieved in any number of ways and based on particular needs.

Note that the example flowchart of FIG. 4 has been offered for purposes of teaching only. Accordingly, some of these steps may be changed, rearranged, deleted, or replaced with other steps where appropriate. Such modifications may be based on particular wagering needs or specific betting and gaming architectures and configurations. Such derivations are within the teachings of the present invention.

As described above, the elements and operations listed in FIGS. 1 through 4 may be achieved with use of gaming system 10 in any number of contexts and applications. Accordingly, communications capabilities, data processing elements, suitable infrastructure, adequate personnel and management, and any other appropriate software, hardware, or data storage objects may be included within gaming system 10 to effectuate the tasks and operations of activities associated with placing a wager. Accordingly, the preceding FIGURES provide only some examples of suitable processing and communications platforms from which a wager may be offered.

Although the present invention has been described in detail with reference to particular embodiments in FIGS. 1 through 4, it should be understood that various other changes, substitutions, and alterations may be made hereto without departing from the sphere and scope of the present invention. For example, end user 12 may be given the opportunity to bet on a rise or decline in price of a single security that is a publicly traded company. Thus, end user 12 could bet on whether the share price of Cisco, Systems (NASDAQ: CSCO) would rise or fall during a given time interval. Moreover, such a wagering opportunity could be accompanied by the eight bets as set forth previously with reference to FIG. 2. In still other scenarios, a suitable financial vehicle could be associated with commodities (e.g. gold, silver, wheat, corn, etc.), futures contracts, bonds, money markets, or any other suitable asset that is subject to some fluctuation and, thereby, speculation by end user 12.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims. In order to assist the United States Patent and Trademark Office (USPTO) and additionally any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of filing hereof unless the words "means for" are specifically used in the particular claims; and (b) does not intend by any statement in the specification to limit his invention in any way that is not otherwise reflected in the appended claims.

What is claimed is:

1. An apparatus, comprising:
   at least one processor; and
   at least one memory having instructions stored thereon which, when executed by the at least one processor, direct the at least one processor to:
      receive a request for wagering information;
      generate an electronic command to cause to render a graphic interface screen, to be displayed at a user interface, at least one betting line having a value correlated to a value of a financial indicator that changes over time and that is displayed on the interface screen during a betting session, in which the at least one betting line comprises a first betting line having a value that is equal to a current value of the financial indicator;
      generate an electronic command to cause to render on the graphic interface screen, to be displayed at the user interface, a first graphic object selectable during the betting session for submitting an up bet request for wagering on the value of the financial indicator achieving a level at a later time that is above the value of the financial indicator at a first time, in which the first graphic object can be selected by a single user multiple different times during the betting session to make a corresponding multiple different wagers on the value of the financial indicator achieving a level at the later time that is above respective different values of the financial indicator at a plurality of different times corresponding to the multiple different times;
      generate an electronic command to cause to render on the graphic interface screen, to be displayed at the user interface, a second graphic object selectable during the betting session for submitting a down bet request for wagering on the value of the financial market indicator achieving a level at the later time that is below the value of the financial indicator at the first time, in which the second graphic object can be selected at a variety of different times during the betting session;
      generate an electronic command to cause to render on the graphic interface screen, to be displayed at the user interface, a payout amount based on an outcome of the betting session;
      generate an electronic command to render on a graphic interface screen of a self-service machine, via a remote electronic interface system, the payout amount; and
      generate an electronic command to cause a physical dispense of the payout amount at the self-service machine, via the remote electronic interface system.

2. The apparatus of claim 1,
   in which the at least one betting line comprises a market betting line, the value of the financial indicator for the market betting line corresponding to a market value of a financial market indicator,
   wherein the first graphic object is selectable for submitting an up bet request for wagering on the market value of the financial market indicator at the later time being above the market value of the financial market indicator at the first time, and
   wherein the second graphic object is selectable for submitting a down bet request for wagering on the market value of the financial market indicator at the later time being below that market value of the financial market indicator at the first time.

3. The apparatus of claim 1,
   in which the at least one betting line comprises a high line, the high line value corresponding to an amount above the value of the financial indicator, and
   in which the graphic interface screen further comprises at least one of:
      a third graphic object selectable for submitting an up bet request for wagering on the value of the financial indicator at the later time being above the high line value at the first time, and
      a fourth graphic object selectable for submitting a down bet request for wagering on the value of the financial indicator at the later time being below the high line value at the first time.

4. The apparatus of claim 1,
   wherein the at least one betting line comprises a low line, the low line value corresponding to an amount below the value of the financial indicator, and
   in which the graphic interface screen further comprises at least one of:
      a third graphic object selectable for submitting an up bet request for wagering on the value of the financial indicator at the later time being above the low line value at the first time, and
      a fourth graphic object selectable for submitting a down bet request for wagering on the value of the financial indicator at the later time being below the low line value at the first time.

5. The apparatus of claim 1,
   wherein the at least one betting line comprises a plurality of spread lines comprising a first spread betting line having a value that corresponds to an amount above the value of the financial indicator and a second spread betting line having a value that corresponds to an amount below the value of the financial indicator, and in which the graphic interface screen further comprises at least one of:

a third graphic object selectable for submitting an up bet request for wagering on the value of the financial indicator at the later time being above the first spread betting line value at the first time, and a third graphic object selectable for submitting a down bet request wagering on the value of the financial indicator at the later time being below the second spread betting line value at the first time.

6. The apparatus of claim 1, wherein each of the plurality of the graphic objects are displayed on the interface screen spatially relative to the betting line, in which the instructions, when executed by the at least one processor, further direct the at least one processor to:

determine odds for at least one of an up bet and a down bet, the graphic interface displaying at least one of the odds for the up bet and the odds for the down bet, wherein the at least one of the odds for the up bet and the odds for the down bet are superimposed on the graphic object.

7. The apparatus of claim 1, in which the instructions, when executed by the at least one processor, further directs the at least one processor to start the betting session, the betting session having a start time and an end time, the value of the financial indicator at the later time determined at the end time of the session, wherein the financial indicator indicates a value of at least one of a security and an index.

8. The apparatus of claim 7, wherein the betting session has at least one of a thirty-second expiration, a one minute expiration, a five minute expiration, a daily expiration, a weekly expiration, and a quarterly expiration.

9. The apparatus of claim 8, wherein a trading day for receiving bet requests comprises multiple intraday betting sessions each having an intraday expiration, in which the first graphic object is selectable during multiple intraday betting sessions for submitting an up bet request for wagering on the value of the financial indicator achieving a level at a later time that is above the value of the financial indicator at a first time of a respective betting session, in which the first graphic object can be selected by a single user multiple different times during each betting session to make a corresponding multiple different wagers on the value of the financial indicator achieving a level at the later time that is above respective different values of the financial indicator at a plurality of different times corresponding to the multiple different times during each betting session; and a second graphic object selectable during multiple intraday betting sessions for submitting a down bet request for wagering on the value of the financial market indicator achieving a level at the later time that is below the value of the financial indicator at the first time of the respective betting session, in which the second graphic object can be selected at a variety of different times during each betting session.

10. The apparatus of claim 7, in which the graphic screen further comprises a betting line having a static value that remains unchanged for the betting session, the value of the financial indicator at the first time being equal to a value of the financial indicator at the start time of the betting session, in which the instructions, when executed by the at least one processor, further directs the at least one processor to determine odds for at least one of an up bet and a down bet based at least on the value of the financial indicator at a time after the first time, and in which the instructions, when executed by the at least one processor, further direct the at least one processor to:

receive a bet request having odds determined at the time of the bet request.

11. The apparatus of claim 10, wherein the graphic interface comprises at least one of the odds for the up bet and the odds for the down bet, in which the instructions, when executed by the at least one processor, further directs the at least one processor to refresh at least one of the up bet odds and the down bet odds automatically to reflect movement in the value of the financial indicator during the betting session.

12. The apparatus of claim 7, in which the instructions, when executed by the at least one processor, further direct the at least one processor to determine odds for at least one of the up bet and the down bet, in which the odds remain unchanged for the betting session, and in which the interface screen comprising a symbol indicating at least one of an upward and a downward movement in the value of the financial indicator.

13. The apparatus of claim 7, wherein the interface screen comprises:

a plurality of betting lines comprising at least one of:

a high line having a value corresponding to an amount above the value of the financial indicator at the first time, and a low line having a value corresponding to an amount below the value of the financial indicator at the first time; and a plurality of graphic objects selectable for submitting at least one of an up bet request and a down bet request for each of the betting lines, in which the instructions, when executed by the at least one processor, further directs the at least one processor to:

determine odds for at least one of an up bet and a down bet for each of the betting lines, the odds remaining unchanged for the betting session; and determine at least one of the high line value and the low line value at a second time to reflect movement in the value of the financial indicator at the second time.

14. The apparatus of claim 13, in which the reference betting line and at least one of the high line and the low line are displayed in the interface screen spatially a first distance from each other at the first time and a second distance from each other at the second time, the first distance and the second distance narrowing based at least on remaining time in the betting session, wherein the at least one of the high line value and the low line value are refreshed to reflect real-time movement in the value of the financial indicator during the betting session, and in which the instructions, when executed by the at least one processor, further direct the at least one processor to:

receive a bet request for wagering on the value of the financial indicator at the later time being above or below the value of the financial indicator at the time of the bet request.

15. The apparatus of claim 7, wherein the interface screen comprises:
a plurality of betting lines comprising:
a reference betting line having a value corresponding to the value of the financial indicator at the first time,
a first spread betting line having a value corresponding to an amount above the value of the financial indicator at the first time, and
a second spread betting line having a value corresponding to an amount below the value of the financial indicator at the first time; and
a plurality of graphic objects selectable for submitting at least one of an up bet request for wagering on the value of the financial indicator at the later time being above the first spread betting line value and a down bet request for wagering on the value of the financial indicator at the later time being below the second spread betting line value,
in which the instructions, when executed by the at least one processor, further directs the at least one processor to:
determine odds for at least one of an up bet and a down bet for each of the betting lines, the odds remaining even during the betting session; and
determine at least one of the first spread betting line value and the second spread betting line value at a second time to reflect movement in the value of the financial indicator at the second time,
wherein the financial indicator corresponds to a market price of a trading product associated with the financial indicator.

16. A method comprising:
receiving, by at least one processor of at least one computer, a request for wagering information;
generating an electronic command for causing to render a graphic interface screen in electronic communication with the at least one processor to be displayed at a user interface, at least one betting line having a value correlated to a value of a financial indicator that changes over time and that is displayed on the interface screen during a betting session, in which the at least one betting line comprises a first betting line having a value that is equal to a current value of the financial indicator;
generating an electronic command for causing to render on the graphic interface screen, to be displayed at the user interface, a first graphic object selectable during the betting session for submitting an up bet request for wagering on the value of the financial indicator achieving a level at a later time that is above the value of the financial indicator at a first time, in which the first graphic object can be selected by a single user multiple different times during the betting session to make a corresponding multiple different wagers on the value of the financial indicator achieving a level at the later time that is above respective different values of the financial indicator at a plurality of different times corresponding to the multiple different times;
generating an electronic command for causing to render on the graphic interface screen, to be displayed at the user interface, a second graphic object selectable during the betting session for submitting a down bet request for wagering on the value of the financial market indicator achieving a level at the later time that is below the value of the financial indicator at the first time, in which the second graphic object can be selected at a variety of different times during the betting session;
generating an electronic command to cause to render on the graphic interface screen, to be displayed at the user interface, a payout amount based on an outcome of the betting session;
generating an electronic command to render on a graphic interface screen of a self-service machine, via a remote electronic interface system, the payout amount; and
generating an electronic command to cause a physical dispense of the payout amount at the self-service machine, via the remote electronic interface system.

17. The method of claim 16,
in which the at least one betting line comprises a market betting line, the value of the financial indicator for the market betting line corresponding to a market value of a financial market indicator,
wherein the first graphic object is selectable for submitting an up bet request for wagering on the market value of the financial market indicator at the later time being above the market value of the financial market indicator at the first time, and
wherein the second graphic object is selectable for submitting a down bet request for wagering on the market value of the financial market indicator at the later time being below that market value of the financial market indicator at the first time.

18. The method of claim 16,
in which the at least one betting line comprises a high line, the high line value corresponding to an amount above the value of the financial indicator, and
in which the graphic interface screen further comprises at least one of:
a third graphic object selectable for submitting an up bet request for wagering on the value of the financial indicator at the later time being above the high line value at the first time, and
a fourth graphic object selectable for submitting a down bet request for wagering on the value of the financial indicator at the later time being below the high line value at the first time.

19. The method of claim 16, further comprising:
starting the betting session at a start time and concluding the betting session at an end time, the value of the financial indicator at the later time determined at the end time of the session, wherein the financial indicator indicates a value of at least one of a security and an index,
wherein the betting session has at least one of a thirty-second expiration, a one minute expiration, a five minute expiration, a daily expiration, a weekly expiration, and a quarterly expiration,
wherein a trading day for receiving bet requests comprises multiple intraday betting sessions each having an intraday expiration,
in which the first graphic object is selectable during the multiple intraday betting sessions for submitting an up bet request for wagering on the value of the financial indicator achieving a level at a later time that is above the value of the financial indicator at a first time of a respective betting session, in which the first graphic object can be selected by a single user multiple different times during each betting session to make a corresponding multiple different wagers on the value of the financial indicator achieving a level at the later time that is above respective different values of the financial indicator at a plurality of different times corresponding to the multiple different times during each betting session; and a second graphic object selectable during the multiple intraday betting sessions for submitting a down bet request for wagering on the value of the financial market indicator achieving a level at the later time that is below the value of the financial indicator at the first time of the respective betting session, in which the second graphic object can be selected at a variety of different times during each betting session, wherein the at least one betting line comprises a low line, the low line value corresponding to an amount below the value of the financial indicator, and in which the graphic interface screen further comprises at least one of:
- a third graphic object selectable for submitting an up bet request for wagering on the value of the financial indicator at the later time being above the low line value at the first time, and
- a fourth graphic object selectable for submitting a down bet request for wagering on the value of the financial indicator at the later time being below the low line value at the first time, wherein the at least one betting line comprises a plurality of spread lines comprising a first spread betting line having a value that corresponds to an amount above the value of the financial indicator and a second spread betting line having a value that corresponds to an amount below the value of the financial indicator, and in which the graphic interface screen further comprises at least one of:
- a third graphic object selectable for submitting an up bet request for wagering on the value of the financial indicator at the later time being above the first spread betting line value at the first time, and
- a third graphic object selectable for submitting a down bet request wagering on the value of the financial indicator at the later time being below the second spread betting line value at the first time.

20. An article of manufacture comprising:

a computer-readable medium that is non-transitory, in which the computer-readable medium stores instructions which, when executed by a processor, direct the processor to:

generate an electronic command to cause to render on a graphic interface screen, to be displayed at a user interface, at least one betting line having a value correlated to a value of a financial indicator that changes over time and that is displayed on the interface screen during a betting session, in which the at least one betting line comprises a first betting line having a value that is equal to a current value of the financial indicator;

generate an electronic command to cause to render on the graphic interface screen, to be displayed at the user interface, a first graphic object selectable during the betting session for submitting an up bet request for wagering on the value of the financial indicator achieving a level at a later time that is above the value of the financial indicator at a first time, in which the first graphic object can be selected by a single user multiple different times during the betting session to make a corresponding multiple different wagers on the value of the financial indicator achieving a level at the later time that is above respective different values of the financial indicator at a plurality of different times corresponding to the multiple different times;

generate an electronic command to cause to render on the graphic interface screen, to be displayed at the user interface, a second graphic object selectable during the betting session for submitting a down bet request for wagering on the value of the financial market indicator achieving a level at the later time that is below the value of the financial indicator at the first time, in which the second graphic object can be selected at a variety of different times during the betting session;

generate an electronic command to cause to render on the graphic interface screen, to be displayed at the user interface, a payout amount based on an outcome of the betting session;

generate an electronic command to render on a graphic interface screen of a self-service machine, via a remote electronic interface system, the payout amount; and generate an electronic command to cause a physical dispense of the payout amount at the self-service machine, via the remote electronic interface system.

* * * * *